United States Patent [19]
Hassan et al.

[11] Patent Number: 5,822,311
[45] Date of Patent: Oct. 13, 1998

[54] RANDOM ACCESS SCHEME FOR MOBILE SATELLITE COMMUNICATIONS

[75] Inventors: Amer Hassan; Stan Reinhold, both of Cary; Larry Massingill, Selma; Eric Wang, Raleigh, all of N.C.

[73] Assignee: Ericsson Inc., Research Triangle Park, N.C.

[21] Appl. No.: 611,490

[22] Filed: Mar. 5, 1996

[51] Int. Cl.⁶ ...................................................... H04J 3/06
[52] U.S. Cl. ......................... 370/322; 370/347; 370/349; 370/508
[58] Field of Search ..................................... 370/322, 347, 370/349, 508; 455/427, 13.2

[56] References Cited

U.S. PATENT DOCUMENTS

| | | |
|---|---|---|
| 4,472,802 | 9/1984 | Pin et al. . |
| 4,827,474 | 5/1989 | LeGoffic et al. . |
| 5,012,469 | 4/1991 | Sardana ................................... 370/95.3 |
| 5,159,593 | 10/1992 | D'Amico et al. ........................ 370/332 |
| 5,166,929 | 11/1992 | Lo . |
| 5,363,373 | 11/1994 | Nakahara et al. . |
| 5,363,375 | 11/1994 | Chuang et al. . |
| 5,420,864 | 5/1995 | Dahlin et al. ............................ 370/347 |
| 5,463,400 | 10/1995 | Tayloe ..................................... 342/352 |
| 5,479,409 | 12/1995 | Dupuy et al. . |
| 5,488,611 | 1/1996 | Zijderhand et al. ..................... 370/349 |
| 5,502,721 | 3/1996 | Pohjakallio .............................. 370/349 |
| 5,502,725 | 3/1996 | Pohjakallio .............................. 370/349 |
| 5,640,395 | 6/1997 | Hamalainen et al. ................... 370/322 |

FOREIGN PATENT DOCUMENTS

| | | | |
|---|---|---|---|
| 0 511 861 | 11/1992 | European Pat. Off. .......... | H04B 7/26 |
| 0 660 544 | 6/1995 | European Pat. Off. ........ | H04B 7/212 |
| WO95/02306 | 1/1995 | WIPO .............................. | H04Q 7/30 |

*Primary Examiner*—Melvin Marcelo
*Attorney, Agent, or Firm*—Burns, Doane, Swecker & Mathis, L.L.P.

[57] ABSTRACT

A method for transmitting random access signals from a mobile unit to a satellite or other control station which requires the transmission of less information than in conventional terrestrial cellular or proposed mobile satellite systems. According to the method, the mobile unit acquires synchronization from the satellite and transmits reduced random access information to the satellite, and the satellite calculates time adjustment information for the mobile units based on the reduced random access information. The random access information is reduced by predetermining a slot number for each mobile unit, and by transmitting only the odd or even status of the frame number desired by the mobile unit.

20 Claims, 3 Drawing Sheets

RANDOM ACCESS SCHEME FOR MOBILE SATELLITE COMMUNICATIONS

FIELD OF THE INVENTION

The present invention relates to data transmission for mobile satellite communications. In particular, the present invention provides an improved method for transmitting random access signals used for call initiation or call paging acknowledgement in mobile satellite communication systems.

BACKGROUND OF THE INVENTION

Referring to FIG. 1, a typical mobile radio-communication system is shown. The typical system includes a number of base stations similar to base station 110 and a number of mobile units or stations similar to mobile 120. Voice and/or data communication can be performed using these devices or their equivalents. The base station includes a control and processing unit 130 which is connected to the MSC (mobile switching center) 140 which in turn is connected to the public switched telephone network (not shown).

The base station 110 serves a limited geographic coverage area, and includes a plurality of voice channels handled by voice channel transceiver 150 which is controlled by the control and processing unit 130. Also, each base station includes a control channel transceiver 160 which may be capable of handling more than one control channel. The control channel transceiver 160 is controlled by the control and processing unit 130. The control channel transceiver 160 broadcasts control information over the control channel of the base station to mobiles locked to that control channel. The voice channel transceiver broadcasts the traffic or voice channels which can include digital control channel location information.

When the mobile 120 first enters an idle mode, it periodically scans the control channels of base stations like base station 110 for the presence of a paging burst addressed to the mobile 120. The paging burst informs mobile 120 which base station to lock on or camp to. The mobile 120 receives the absolute and relative information broadcast on a control channel at its voice and control channel transceiver 170. Then, the processing unit 180 evaluates the received control channel information which includes the characteristics of the candidate cells and determines which cell the mobile should lock to. The received control channel information not only includes absolute information concerning the base station with which it is associated, but also contains relative information concerning adjacent coverage areas with which the control channel is associated. These adjacent coverage areas are periodically scanned while monitoring the primary control channel to determine if there is a more suitable candidate. Additional information relating to specifics of mobile and base station implementations can be found in U.S. patent application Ser. No. 07/967,027 entitled "Multi-Mode Signal Processing" filed on Oct. 27, 1992 to P. Dent and B. Ekelund, the entirety of which is incorporated herein by reference. It will be appreciated that the base station may be replaced by one or more satellites in a satellite-based mobile radio-communication system.

To increase communication system capacity, digital communication and multiple access techniques such as Frequency Division Multiple Access (FDMA), Time Division Multiple Access (TDMA), and Code Division Multiple Access (CDMA) may be used. The objective of each of these multiple access techniques is to combine signals from different sources onto a common transmission medium in such a way that, at their destinations, the different channels can be separated without mutual interference. In a FDMA system, users share the radio spectrum in the frequency domain. Each user is allocated a part of the frequency band which is used throughout a conversation. In a TDMA system, users share the radio spectrum in the time domain. Each radio channel or carrier frequency is divided into a series of time slots, and individual users are allocated a time slot during which the user has access to the entire frequency band allocated for the system (wideband TDMA) or only a part of the band (narrowband TDMA). Each time slot contains a "burst" of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user. In a CDMA system, each user is assigned a unique pseudorandom user code to uniquely access the frequency time domain. Examples of CDMA techniques include spread spectrum and frequency hopping.

Transmission of signals in a TDMA system occurs in a buffer-and-burst, or discontinuous-transmission, mode: each mobile unit transmits or receives only during its assigned time slots in the TDMA frames on the mobile unit's assigned frequency. At full rate, for example, a mobile station might transmit during slot 1, receive during slot 2, idle during slot 3, transmit during slot 4, receive during slot 5, and idle during slot 6, and then repeat the cycle during succeeding TDMA frames. The mobile unit, which may be battery-powered, can be switched off (or "sleep") to save power during the time slots when it is neither transmitting nor receiving.

In a TDMA system, the successive time slots assigned to the same user, which are usually not consecutive time slots on the radio carrier, constitute the user's digital traffic channel, which is considered to be a logical channel assigned to the user. The organization of TDMA channels, using the GSM standard as an example, is shown in FIG. 2. The TDMA channels include traffic channels TCH and signalling channels SC. The TCH channels include full-rate and half-rate channels for transmitting voice and/or data signals. The signalling channels SC transfer signalling information between the mobile unit and the satellite (or base station). The signalling channels SC include three types of control channels: broadcast control channel (BCCHs), common control channels (CCCHs) shared between multiple subscribers, and dedicated control channels (DCCHs) assigned to a single subscriber. A BCCH typically includes a frequency correction channel (FCH) and a synchronization channel (SCH), both of which are downlink channels. The common control channels (CCCHs) include downlink paging (PCH) and access grant (AGCH) channels, as well as the uplink random access channel (RACH). The dedicated control channels DCCH include a fast associated control channel (FACCH), a slow associated control channel (SACCH), and a standalone dedicated control channel (SDCCH). The slow associated control channel is assigned to a traffic (voice or data) channel or to a standalone dedicated control channel (SDCCH). The SACCH channel provides power and frame adjustment and control information to the mobile unit.

The random access channel RACH is used by the mobiles to request access to the system. The RACH logical channel is a unidirectional uplink channel (from the mobile to the base station or satellite), and is shared by separate mobile units (one RACH per cell is sufficient in typical systems, even during periods of heavy use). Mobile units continuously monitor the status of the RACH channel to determine if the channel is busy or idle. If the RACH channel is idle, a mobile unit desiring access sends access data, such as the mobile's identification number, call established cause, and the desired telephone number, on the RACH to the base station or satellite. The MSC receives this information from the base station or satellite and assigns an idle voice channel to the mobile station, and transmits the channel identification to the mobile through the base station or satellite over the access grant channel AGCH so that the mobile station can tune itself to the new channel. All time slots on the RACH uplink channel are used for mobile access requests, either on a contention basis or on a reserved basis. Contention-basis access schemes include ALOHA, CSMA, CSMA-CD, and other access protocols. Reserved-basis access is described in U.S. patent application No. 08/140,467 now U.S. Pat. No. 5,420,864, entitled "Method of Effecting Random Access in a Mobile Radio System", which was filed on Oct. 25, 1993, and which is incorporated in this application by reference. One important feature of RACH operation is that reception of some downlink information is required, whereby mobile stations receive real-time feedback for every burst they send on the uplink. This is known as Layer 2 ARQ, or automatic repeat request, on the RACH. The downlink information preferably comprises twenty-two bits that may be thought of as another downlink sub-channel dedicated to carrying, in the downlink, Layer 2 information specific to the uplink. This flow of information, which can be called shared channel feedback, enhances the throughput capacity of the RACH so that a mobile station can quickly determine whether any burst of any access attempt has been successfully received.

In conventional terrestrial cellular communications systems such as GSM, a random access channel (RACH) burst includes 68.25 bits as a guard time to prevent collisions with traffic bursts on adjacent time slots. The guard bits allow the random access burst to be received at the base station within a predicted time slot, for a mobile station within 35 Km of the associated base station. Specifically, the mobile phone acquires synchronization from a downlink channel, such as the broadcast control channel (BCCH). The mobile then transmits a signal on the RACH channel on a time slot some number of time slots after the initial synch information. The offset for transmitting the RACH signal can be a random offset or a specified fixed offset. The transmitted RACH burst will be received at the base station within the predicted time slot if the distance between the base station and the mobile is as specified above. The guard bits are necessary because the RACH burst is sent before the mobile has received a time advance command from the base station.

In mobile satellite communications the beams from a single satellite are coverage areas analogous to cells in a terrestrial system. Typically each satellite will have 140 beams, each beam providing a coverage area of about 500 Km or more in diameter. Because of the size of a beam, there is an end-to-end delay within a beam of about 6 ms, resulting in a time ambiguity within a beam of ±3 ms. Therefore, the use of guard bits as in a conventional system does not resolve collision and ambiguity problems, since a slotted RACH in a satellite system would require a very long guard time.

SUMMARY OF THE INVENTION

The present invention provides a method for transmitting random access information in a satellite mobile communication system. According to the method, the mobile unit acquires synchronization from a satellite or other control station, based on the high power short message service (HP-SMS) burst or other suitable signal. After some fixed or random time offset, the mobile unit transmits the necessary random access information, including a desired frame and slot number, on a dedicated RACH carrier. Based on the information received from the mobile, the satellite or control station calculates the differential delay between users and send appropriate time advance or retard information to the particular users.

BRIEF DESCRIPTION OF THE DRAWINGS

The foregoing objects, features and advantages of the present invention will be more readily understood upon reading the following detailed description in conjunction with the drawings in which.

DETAILED DESCRIPTION OF PREFERRED EMBODIMENTS

While the following description is directed toward a short message service implemented in a satellite-based radio-communication system, it will be appreciated that the present invention may also be applied to other types of communication systems.

Figure 1:
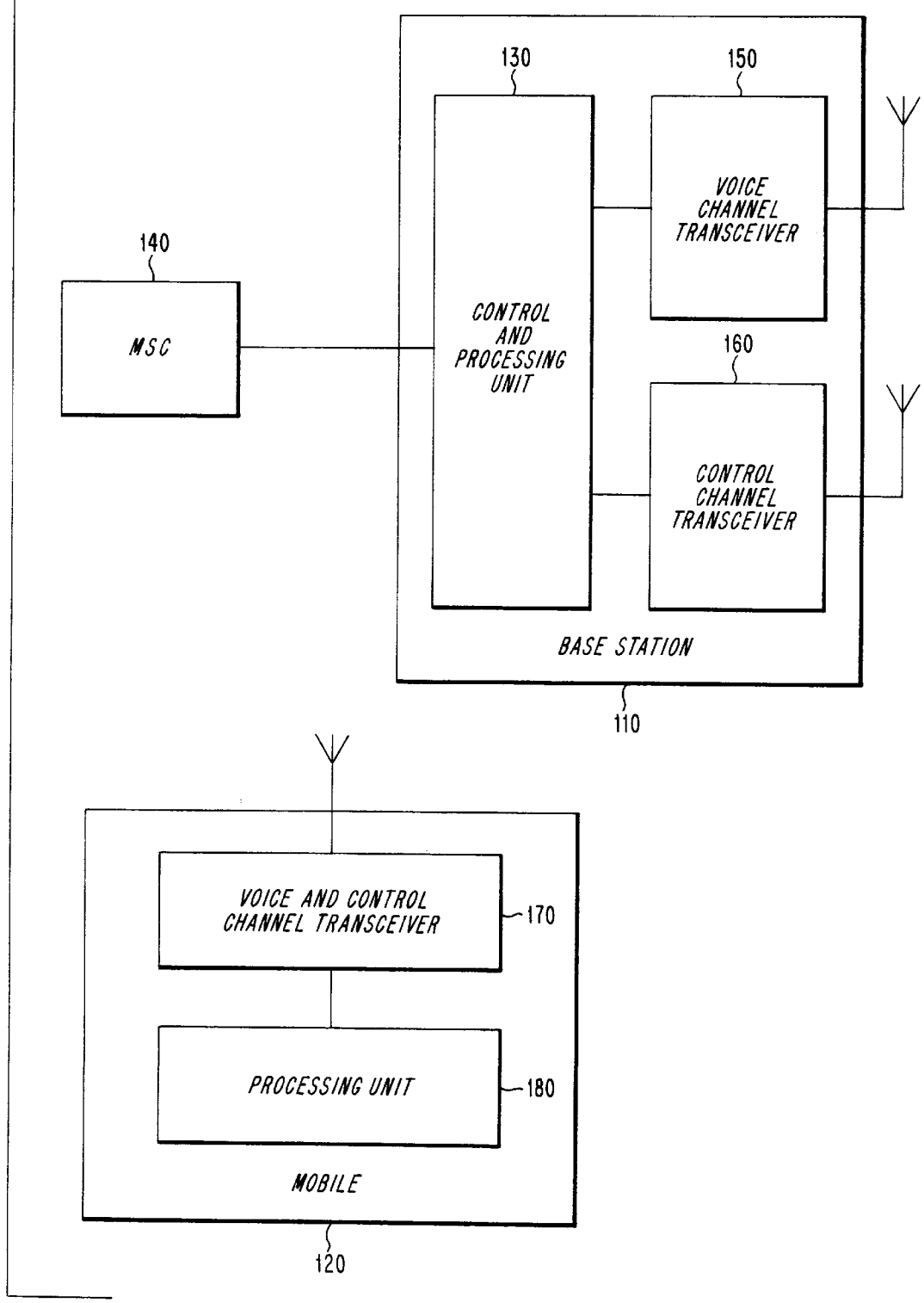
FIG. 1 is a block diagram of an exemplary mobile radio-communication system.
Figure 2:
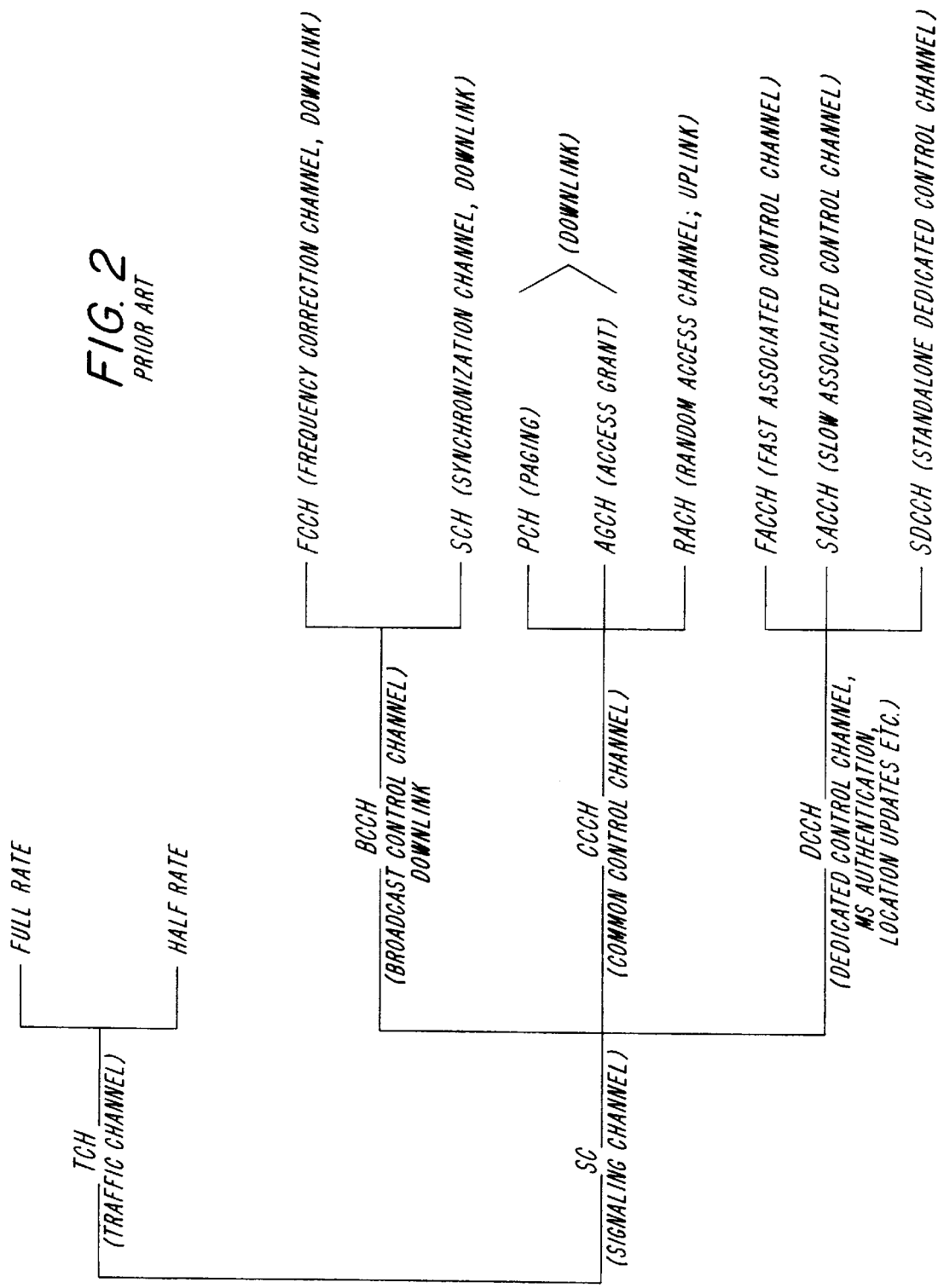
FIG. 2 is a diagram showing the organization of channels in a typical GSM digital radio-communication system.
Figure 3:
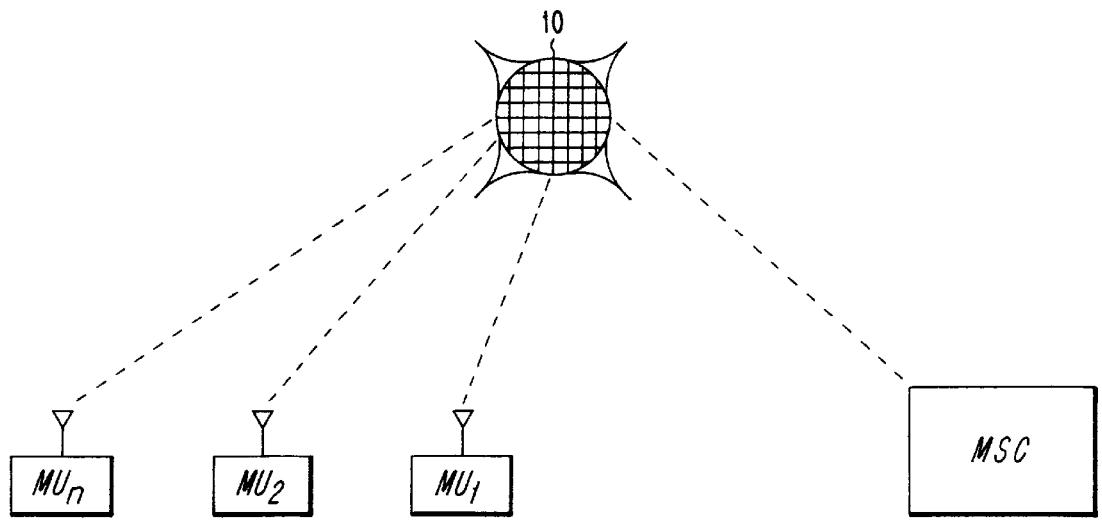
FIG. 3 is a diagram of a satellite-based mobile radio-communication system in which the signal transmission method of the present invention may be implemented.

Referring now to FIG. 3, a satellite-based mobile communication system in which the method of the present invention may be implemented is shown. The system includes one or more satellites 10, a mobile switching center MSC which exchanges communication signals with one or more satellites and is connected to the PSTN (public switched telephone network; not shown), and any number of mobile units $MU_n$. In such a system, communication links for exchanging voice or data can be established between a mobile unit and either a standard telephone or a second mobile unit through one satellite, multiple satellites, or a combination of one or more satellites and the PSTN. Such a system may be desirable to achieve a broad geographical coverage in which few or no base stations are present, and additional base stations are not practical, such as in rural areas.

Figure 4:
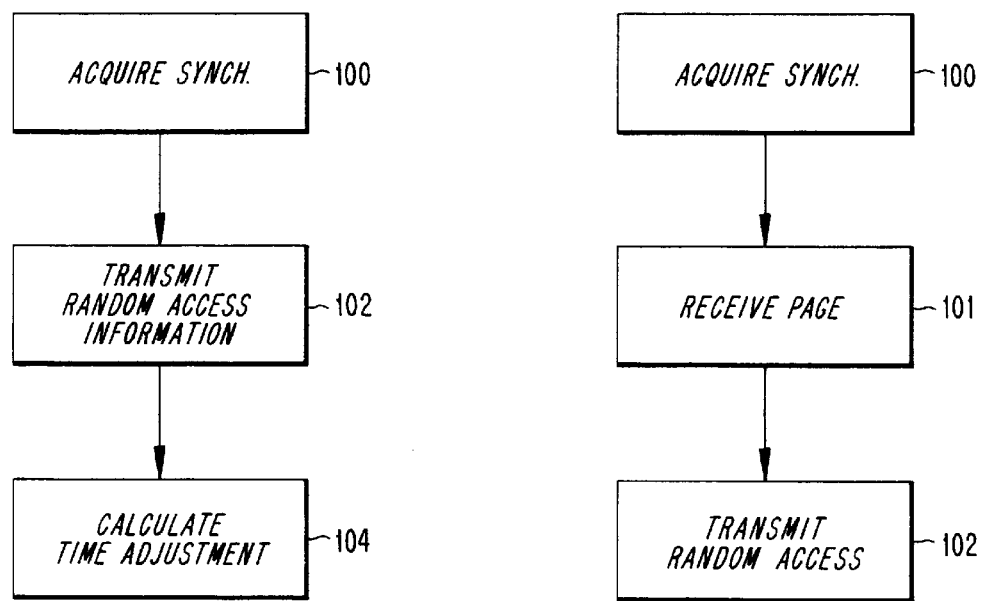
FIG. 4 is a flow chart describing a random access method according to an embodiment of the present invention.

Referring now to FIG. 4, a flow chart describing the steps of an exemplary method of the present invention is shown. The process begins at step 100, in which the mobile unit acquires synchronization information from the satellite. The synchronization information can be acquired from a variety of source signals transmitted by the satellite such as, for example, a high power short message service (HP-SMS) burst transmitted as described in copending, commonly assigned application Ser. No. 08/559,692, entitled "High Penetration Transmission Method For A Radio-communication System". In step 102, the mobile unit then transmits on the uplink RACH channel one or more RACH bursts which preferably include information such as coded message data (which includes information and redundancy bits), coded frame information identifying a predicted frame on which the mobile unit desires to transmit (after a random number of frames), and coded slot information identifying a predicted slot on which the mobile unit desires to transmit (after a random number of slots). In step 104, the satellite calculates the time adjustment necessary from the coded frame information and coded slot information using any suitable method for calculating time adjustments.

Alternatively, the mobile unit may transmit only a single frame bit to indicate whether the frame number is to be an odd-numbered frame or an even-numbered frame. This single bit of information is sufficient to enable the satellite to determine the necessary time adjustment for differential delays less than twice the length of a TDMA frame, a characteristic of most regional mobile satellite systems.

However, for a satellite beam having a relatively small size and small differential delay, this scheme will result in high collision probability. To avoid this, a mobile unit may choose a particular time slot to transmit the RACH burst based on the mobile's own identification number, e.g., the temporary mobile station identifier (TMSI) or the international mobile station identifier (IMSI). In this way, the RACH traffic can be evenly distributed over the duration of a frame to reduce the collision probability. Since the mobile unit's identification number is known to the base station, the satellite or base station knows which time slot the mobile unit is transmitting the RACH burst on, and can determine the necessary time adjustment for the mobile unit.

In the case where the maximum differential delay within a beam of the entire system is always less than a frame, the mobile unit need not indicate the predicted frame or slot number on which it desires to transmit.

The random access transmission scheme can be further simplified by predetermining that all transmissions from a particular mobile unit will occur in a given slot of a given frame. By predetermining the transmission slot and frame number, the random access channel information need not include coded time slot information, further reducing the information required in the RACH bursts. By transmitting only the even or odd status of the desired frame and pre-assigning a slot number to each mobile unit, the random access channel information (coded frame and slot numbers) can be reduced to a single information bit. Accordingly, the need for guard bits is unnecessary and is substantially reduced by the method of the present invention, thereby increasing transmission efficiency.

Figure 5:
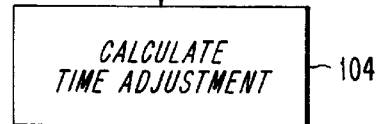
FIG. 5 is a flow chart describing a random access method according to an alternate embodiment of the present invention.

Referring now to FIG. 5, a flow chart describing the steps of an alternate embodiment of the method of the present invention. The embodiment of FIG. 5 differs from that of FIG. 4 in that the FIG. 5 embodiment includes a step 101 for receiving a page signal prior to transmitting the random access information to the satellite in step 102.

While the foregoing description includes numerous details and specificities, it is to be understood that these are for purposes of explanation only, and are not to be construed as limitations of the invention. Numerous modifications to the described examples will be readily apparent to one of ordinary skill in the art which do not depart from the spirit and scope of the invention, as defined by the following claims and their legal equivalents.

What is claimed is:

1. A method for acquiring access by a transmitter/receiver to a TDMA communication system, comprising the steps of:

receiving a synchronization signal from a control station;

transmitting access channel data from the transmitter/receiver to the control station, the access channel data identifying a predicted TDMA frame for communication between the transmitter/receiver and the control station; and determining, at the control station, a time adjustment necessary for communication between the transmitter/receiver and the control station based on the access channel data.

2. The method of claim 1, wherein the access channel data identifies the predicted TDMA frame using a single data bit indicative of the even-numbered or odd-numbered status of an predicted TDMA frame.

3. The method of claim 1, wherein a slot number on which the transmitter/receiver will transmit is pre-assigned.

4. The method of claim 1, wherein the transmitter/receiver is a mobile station and the control station is a satellite.

5. The method of claim 1, wherein the synchronization signal is a message signal containing coded message data.

6. The method of claim 1, wherein a transmission delay between the transmitter/receiver and the control station is less than twice the length of a TDMA frame.

7. The method of claim 4, wherein the transmitter/receiver transmits the access channel data over a random access channel on a dedicated carrier frequency.

8. The method of claim 1, further comprising the step of receiving a page signal from the control station prior to the step of transmitting.

9. The method of claim 1, wherein an slot number on which the transmitter/receiver will transmit is determined by the transmitter/receiver based on a identification value known to the control station.

10. A method for acquiring access by a transmitter/receiver to a TDMA communication system, comprising the steps of:

receiving a synchronization signal from a control station;

transmitting access channel data form the transmitter/receiver to the control station, the access channel data identifying a predicted frame and slot number using a single information bit; and determining, at the control station, a time adjustment necessary for communication between the transmitter/receiver and the control station based on the access channel data, wherein a maximum transmission delay between the transmitter/receiver and the control station is less than the length of a TDMA frame.

11. The method of claim 10, wherein a slot number on which the transmitter/receiver will transmit is pre-assigned.

12. The method of claim 10, wherein the transmitter/receiver is a mobile station and the control station is a satellite.

13. The method of claim 10, wherein the synchronization signal is a message signal containing coded message data.

14. The method of claim 10, wherein the transmitter/receiver transmits the access channel data over a random access channel on a dedicated carrier frequency.

15. The method of claim 10, further comprising the step of receiving a paging signal from the control station prior to the step of transmitting.

16. The method of claim 10, wherein the slot number on which a transmitter/receiver will transmit is determined by the transmitter/receiver based on an identification value known to the control station.

17. The method of claim 1, wherein the transmitter/receiver is a mobile station and the control station is a base station of a cellular communication system.

18. The method of claim 10, wherein the transmitter/receiver is a mobile station and the control station is a base station of a cellular communication system.

19. A method for acquiring access by a transmitter/receiver to a TDMA communication system, comprising the steps of:

receiving a synchronization signal from a control station;

transmitting access data from the transmitter/receiver to the control station on a predetermined time slot;

determining, at the control station, a time adjustment necessary for communication between the transmitter/receiver and the control station based on the access data; and granting access to the transmitter/receiver.

20. The method of claim 19, wherein the access data identifies a predicted frame and time slot using a single information bit.

* * * * *